US009303542B2

(12) United States Patent
Aoki

(10) Patent No.: US 9,303,542 B2
(45) Date of Patent: Apr. 5, 2016

(54) HONEYCOMB CATALYST BODY

(71) Applicant: NGK INSULATORS, LTD., Nagoya (JP)

(72) Inventor: Takashi Aoki, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 201 days.

(21) Appl. No.: 14/086,023

(22) Filed: Nov. 21, 2013

(65) Prior Publication Data

US 2014/0154144 A1   Jun. 5, 2014

(30) Foreign Application Priority Data

Dec. 3, 2012 (JP) ................................. 2012-264747

(51) Int. Cl.
| | |
|---|---|
| *B01D 50/00* | (2006.01) |
| *F01N 3/28* | (2006.01) |
| *B01J 35/00* | (2006.01) |
| *B01J 35/04* | (2006.01) |
| *B01J 35/10* | (2006.01) |
| *B01J 37/02* | (2006.01) |

(Continued)

(52) U.S. Cl.
CPC .............. *F01N 3/2828* (2013.01); *B01J 35/002* (2013.01); *B01J 35/006* (2013.01); *B01J 35/04* (2013.01); *B01J 35/10* (2013.01); *B01J 35/1076* (2013.01); *B01J 37/0215* (2013.01); *C04B 38/0009* (2013.01); *C04B 2111/0081* (2013.01)

(58) Field of Classification Search
CPC .................. C04B 38/0009; C04B 2111/0081; B01J 35/04; B01J 35/1076; B01J 35/0006

USPC .................................................. 422/177, 180
See application file for complete search history.

(56) References Cited

U.S. PATENT DOCUMENTS

| | | | | |
|---|---|---|---|---|
| 6,753,294 B1 * | 6/2004 | Brisley | .............. | B01D 53/9431 502/400 |
| 7,119,044 B2 * | 10/2006 | Wei | .................... | B01D 53/9431 252/373 |

(Continued)

FOREIGN PATENT DOCUMENTS

| | | |
|---|---|---|
| EP | 2 324 904 A2 | 5/2011 |
| JP | 2003-205245 A1 | 7/2003 |

(Continued)

OTHER PUBLICATIONS

Extended European Search Report (Application No. 13194028.0) dated Apr. 9, 2014.

*Primary Examiner* — Tom P Duong
(74) *Attorney, Agent, or Firm* — Burr & Brown, PLLC

(57) ABSTRACT

A honeycomb catalyst body capable of containing in a limited space, having high mechanical strength, less pressure loss, and suitable purification performance is provided, and it includes a plugged honeycomb structure having porous partition walls defining cells, plugged portions, and porous projecting portions projecting so as to extend from the partition walls into the cells and being formed integrally with the partition walls; and catalysts loaded onto the projecting portions, wherein a porosity of the partition walls is 40 to 70%, thicknesses of the projecting portions is from 30 to 140% of thicknesses of the partition wall, an amount of the catalyst loaded onto the partition walls thereof is smaller than an amount of the catalyst loaded onto the projecting portions, one catalyst loaded onto projecting portions is a selective reduction catalyst, and another catalyst loaded onto projecting portions is an ammonia slip preventing catalyst.

8 Claims, 3 Drawing Sheets

(51) Int. Cl.
*C04B 38/00* (2006.01)
*C04B 111/00* (2006.01)

(56) References Cited

U.S. PATENT DOCUMENTS

| | | | | |
|---|---|---|---|---|
| 8,470,255 | B2* | 6/2013 | Mizutani et al. | 422/177 |
| 8,603,942 | B2* | 12/2013 | Goto et al. | 502/439 |
| 2004/0076565 | A1* | 4/2004 | Gandhi | B01D 53/8631 423/235 |
| 2005/0031514 | A1* | 2/2005 | Patchett | B01D 5/0054 423/239.2 |
| 2010/0061903 | A1* | 3/2010 | Kohara et al. | 423/213.2 |
| 2010/0175372 | A1* | 7/2010 | Lambert | B01D 53/9472 60/297 |
| 2011/0179777 | A1* | 7/2011 | Chandler | F01N 3/0222 60/297 |
| 2011/0201493 | A1 | 8/2011 | Goto et al. | |

FOREIGN PATENT DOCUMENTS

| | | |
|---|---|---|
| JP | 2003-307115 A1 | 10/2003 |
| JP | 2005-220848 A1 | 8/2005 |
| JP | 2006-255539 A1 | 9/2006 |
| JP | 2011-104524 A1 | 6/2011 |

\* cited by examiner

HONEYCOMB CATALYST BODY

The present application is an application based on JP-2012-264747 filed on Dec. 3, 2012 with the Japanese Patent Office, the entire contents of which are incorporated herein by reference.

BACKGROUND OF THE INVENTION

1. Field of the Invention

The present invention relates to a honeycomb catalyst body. More particularly, the present invention relates to a honeycomb catalyst body capable of containing in a limited space, having high mechanical strength, less pressure loss, and suitable purification performance.

2. Background Art

It has been demanded that harmful substances such as $NO_x$ in exhaust gases discharged from internal combustion engines such as an automobile engine, a construction machine engine and a stationary engine for industrial machine, the other burning devices and the like are purified and then discharged, in consideration of influences on the environment. Therefore, in order to purify this harmful substances, there has been used an exhaust gas purifying device including a plurality of honeycomb catalyst bodies in which a catalyst is loaded onto a honeycomb structure being carrier (e.g., see Patent Document 1).

As each honeycomb catalyst body, for example, there is known a honeycomb catalyst body including partition walls defining a plurality of cells to become through channels of a fluid and being loaded a predetermined catalyst onto the partition walls. Moreover, when the honeycomb catalyst body is used, the catalyst comes in contact with an exhaust gas at the time that the exhaust gas flows through the cells of the honeycomb catalyst body, and thereby the harmful substances in the exhaust gas are purified.

Examples of the honeycomb catalyst body include a honeycomb catalyst body loaded with a selective reduction catalyst (SCR), a honeycomb catalyst body loaded with an ammonia slip preventing catalyst (ASC), and a honeycomb catalyst body loaded with a three-way catalyst. In the above exhaust gas purifying device, these honeycomb catalyst bodies are suitably selected and arranged in series.

Such an exhaust gas purifying device is large (i.e., a length in an exhaust gas flow direction is long), and there has been a problem that it is difficult to ensure a space capable of mounting this exhaust gas purifying device. Consequently, to solve such a problem, there is disclosed a filter having a compact constitution (a honeycomb catalyst body) (e.g., see Patent Document 2).

[Patent Document 1] JP-A-2006-255539
[Patent Document 2] JP-A-2011-104524

SUMMARY OF THE INVENTION

In a filter (a honeycomb catalyst body) disclosed in Patent Document 2, for preventing an increase of a pressure loss while ensuring a purification performance of a catalyst, a porosity of each partition wall is set larger. Therefore, there is a case where mechanical strength of the partition walls cannot sufficiently be obtained at the case of trying to prevent the increase of the pressure loss, and therefore the partition walls might be broken when a load is applied to the partition walls at canning. Moreover, when the purification performance of the catalyst is ensured, i.e., when an amount of the loaded catalyst is large, pores to become through channels of an exhaust gas become narrow, and thereby the pressure loss may increase.

The present invention has been developed in view of problems of such conventional technologies. An object thereof is to provide a honeycomb catalyst body capable of containing in a limited space, having high mechanical strength, less pressure loss, and suitable purification performance.

According to the present invention, the following honeycomb catalyst body is provided.

[1] A honeycomb catalyst body including a plugged honeycomb structure having porous partition walls defining a plurality of cells extending from an inflow side end face to an outflow side end face to become through channels of a fluid, inflow side plugged portions provided at outflow side ends of the predetermined cells, outflow side plugged portions provided at inflow side ends of the remaining cells, and porous projecting portions projecting so as to extend from the partition walls into inflow cells being the cells provided with the outflow side plugged portions and into outflow cells being the cells provided with the inflow side plugged portions and being formed integrally with the partition walls; and catalysts loaded onto the projecting portions of the plugged honeycomb structure, wherein a porosity of each of the partition walls of the plugged honeycomb structure is from 40% to 70%, a thickness of each of the projecting portions is from 30 to 140% of a thickness of each of the partition walls, an amount of the catalyst loaded onto the partition walls in a cross section perpendicular to an extending direction of the cells is 40% or less of a total amount of the catalysts loaded onto the plugged honeycomb structure, and an amount of the catalyst to be loaded onto the partition walls is smaller than an amount of the catalyst to be loaded onto the projecting portions, the catalyst loaded onto the projecting portions extending into the inflow cells of the plugged honeycomb structure is a selective reduction catalyst, and the catalyst loaded onto the projecting portions extending into the outflow cells of the plugged honeycomb structure is an ammonia slip preventing catalyst.

[2] The honeycomb catalyst body according to the above [1], wherein the amount of the catalyst loaded onto the partition walls of the plugged honeycomb structure is 5% or less of the total amount of the catalysts loaded onto the plugged honeycomb structure.

[3] The honeycomb catalyst body according to the above [1] or [2], wherein an average pore diameter of the partition walls of the plugged honeycomb structure is 25 µm or less.

[4] The honeycomb catalyst body according to any one of the above [1] to [3], wherein each of the projecting portions of the plugged honeycomb structure is in the form of a wall defining the cell to form a plurality of cells.

[5] The honeycomb catalyst body according to any one of the above [1] to [3], wherein each of the projecting portions of the plugged honeycomb structure is in the form of a protrusion projecting from the partition wall.

[6] The honeycomb catalyst body according to any one of the above [1] to [5], wherein the thickness of each of the partition walls of the plugged honeycomb structure is from 64 to 508 µm.

In a honeycomb catalyst body of the present invention, a selective reduction catalyst (SCR) is loaded onto projecting portions extending into inflow cells of a plugged honeycomb structure, and an ammonia slip preventing catalyst (ASC) is loaded onto projecting portions extending into outflow cells of the plugged honeycomb structure. Therefore, without using a plurality of honeycomb catalyst bodies (a honeycomb catalyst body loaded with the SCR and a honeycomb catalyst body loaded with the ASC), purification of harmful substances in an exhaust gas can suitably be performed by one honeycomb catalyst body. That is, the honeycomb catalyst body of the present invention is the one honeycomb catalyst body, but a purification performance thereof is suitable. In this way, when the honeycomb catalyst body of the present invention is used, the honeycomb catalyst body, which has heretofore been used plural, can be used only one, and thereby the honeycomb catalyst body can suitably be contained in a space even when a containing space is limited such as automobile. That is, when the honeycomb catalyst body of the present invention is used, the containing space of the honeycomb catalyst body may be small. Moreover, in the honeycomb catalyst body of the present invention, a porosity of each of partition walls of the plugged honeycomb structure is from 40 to 70%, and thereby the partition walls are comparatively dense. Therefore, the honeycomb catalyst body of the present invention has high mechanical strength. Moreover, in the honeycomb catalyst body of the present invention, a thickness of each of the projecting portions is from 30 to 140% of a thickness of each of the partition walls, and thereby it is possible to suppress an initial pressure loss lower while ensuring the strength of the plugged honeycomb structure. Furthermore, in the honeycomb catalyst body of the present invention, an amount of the catalyst loaded onto the partition walls in a cross section perpendicular to an extending direction of the cell is 40% or less of a total amount of the catalysts loaded onto the plugged honeycomb structure. Additionally, the amount of the catalyst to be loaded onto the partition walls is smaller than an amount of the catalyst to be loaded onto the projecting portions. Therefore, in the honeycomb catalyst body of the present invention, it is possible to suppress an increase of a pressure loss caused by loading a large amount of the catalyst onto the partition walls to clog or noticeably narrow pores in the partition walls. Furthermore, in the honeycomb catalyst body of the present invention, the amount of the catalyst to be loaded onto the partition walls is reduced to prevent the increase of the pressure loss, but instead, a larger amount of the catalyst is loaded onto the projecting portions than onto the partition walls, and thereby a catalyst performance is maintained and the purification performance is suitable.

DETAILED DESCRIPTION OF THE INVENTION

Hereinafter, embodiments of the present invention will be described. It should be understood that the present invention is not limited to the following embodiments and that suitable modifications, improvements and the like added to the following embodiments on the basis of ordinary knowledge of a person skilled in the art without departing from the gist of the present invention also fall in the gist of the present invention.

Figure 1:
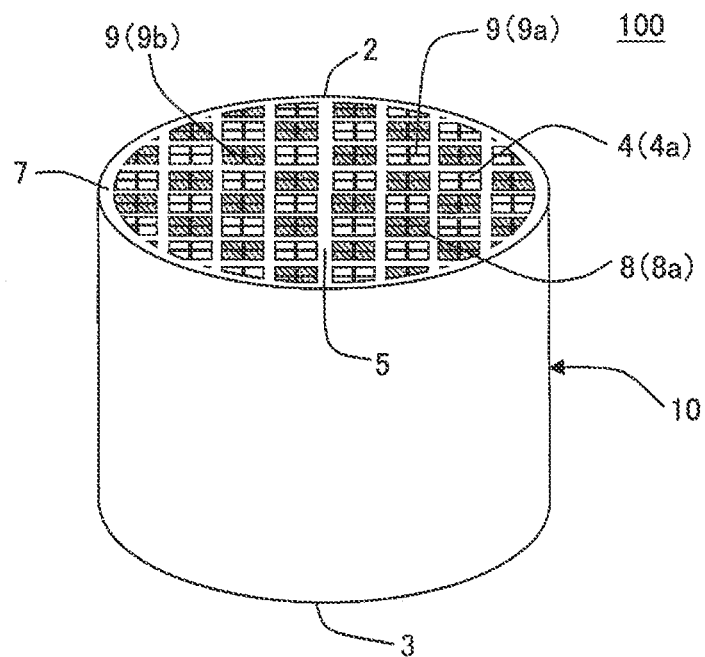
FIG. 1 is a perspective view schematically showing one embodiment of a honeycomb catalyst body of the present invention.
Figure 2:
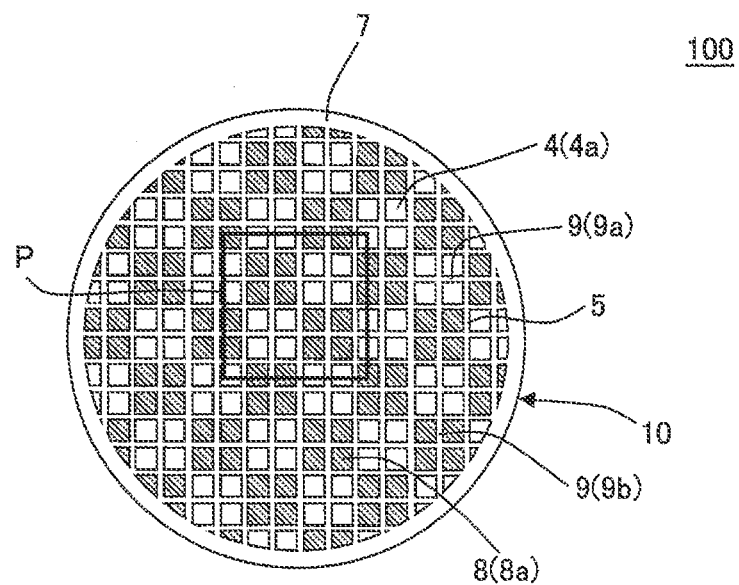
FIG. 2 is a plan view schematically showing one end face in the one embodiment of the honeycomb catalyst body of the present invention.
Figure 3:
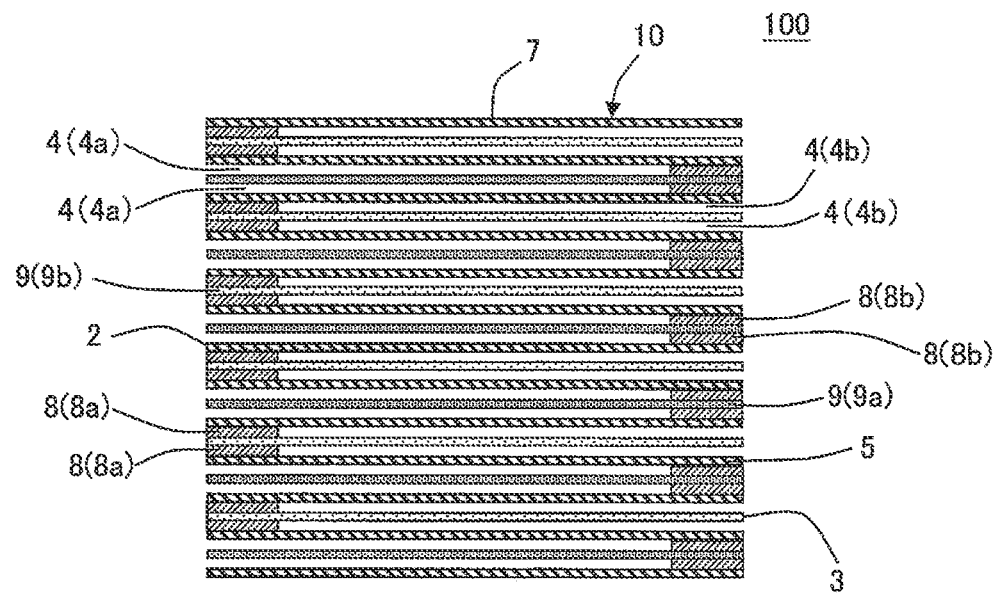
FIG. 3 is a cross sectional view schematically showing a cross section parallel to an extending direction of the cell in the one embodiment of the honeycomb catalyst body of the present invention.

[1] Honeycomb Catalyst Body:

One embodiment of the honeycomb catalyst body of the present invention is a honeycomb catalyst body 100 shown in FIG. 1 to FIG. 3. The honeycomb catalyst body 100 includes a plugged honeycomb structure 10 having partition walls 5, inflow side plugged portions 8a, outflow side plugged portions 8b, and projecting portions 9; and catalysts loaded onto the projecting portions 9 of the plugged honeycomb structure 10. The partition walls 5 are porous partition walls defining a plurality of cells 4 extending from an inflow side end face 2 to an outflow side end face 3 to become through channels of a fluid. The inflow side plugged portions 8a are provided at ends (inflow side ends) of the predetermined cells in the inflow side end face 2. The outflow side plugged portions 8b are provided at ends (outflow side ends) of the remaining cells in the outflow side end face 3. The projecting portions 9 are porous portions projecting so as to extend from the partition walls 5 into inflow cells 4a being the cells provided with the outflow side plugged portions 8b and into outflow cells 4b being the cells provided with the inflow side plugged portions 8a and being formed integrally with the partition walls 5. In the honeycomb catalyst body 100, a porosity of each of the partition walls 5 of the plugged honeycomb structure 10 is from 40% to 70%. Moreover, in the honeycomb catalyst body 100, a thickness of each of the projecting portions 9 is from 30 to 140% of a thickness of each of the partition walls 5. In the honeycomb catalyst body 100, an amount of the catalyst loaded onto the partition walls 5 in a cross section perpendicular to an extending direction of the cells is 40% or less of a total amount of the catalysts loaded onto the plugged honeycomb structure 10. Moreover, an amount of the catalyst to be loaded onto the partition walls 5 is smaller than an amount of the catalyst to be loaded onto the projecting portions 9. Furthermore, the catalyst loaded onto the projecting portions 9(9a) extending into the inflow cells 4a of the plugged honeycomb structure 10 is a selective reduction catalyst, and the catalyst loaded onto the projecting portions 9(9b) extending into the outflow cells 4b of the plugged honeycomb structure 10 is an ammonia slip preventing catalyst.

In the honeycomb catalyst body 100, plugged portions 8 (the inflow side plugged portions 8a and the outflow side plugged portions 8b) are alternately arranged with the predetermined cells and the remaining cells, so as to form a so-called checkered pattern. The plugged honeycomb structure 10 further has a peripheral wall 7 disposed in an outer periphery. It is to be noted that the honeycomb catalyst body of the present invention does not necessarily have to have the peripheral wall 7.

In such a honeycomb catalyst body 100, the selective reduction catalyst (SCR) is loaded onto the projecting portions 9 (inflow cell side projecting portions 9a) extending into the inflow cells 4a of the plugged honeycomb structure 10 and the surfaces of the partition walls 5 at an inflow cell 4a side. Moreover, in the honeycomb catalyst body 100, the ammonia slip preventing catalyst (ASC) is loaded onto the projecting portions 9 (outflow cell side projecting portions 9b) extending into the outflow cells 4b of the plugged honeycomb structure 10 and the surfaces of the partition walls 5 at an outflow cell 4b side. Therefore, without using a plurality of honeycomb catalyst bodies (a honeycomb catalyst body loaded with SCR and a honeycomb catalyst body loaded with the ASC), purification of harmful substances in an exhaust gas can suitably be performed by one honeycomb catalyst body. In this way, according to the honeycomb catalyst body 100, the honeycomb catalyst body, which have heretofore been used plural, can be used only one, and thereby the honeycomb catalyst body can suitably be contained in a space even when a containing space is limited such as automobile. Furthermore, the one honeycomb catalyst body is used, and thereby canning is not troublesome. That is, when the plurality of honeycomb catalyst bodies is used, the canning of each of the honeycomb catalyst bodies is required, but when the one honeycomb catalyst body is used, the canning may be performed only once.

Moreover, in the plugged honeycomb structure 10, the porosity of each of the partition walls 5 is from 40% to 70%, and thereby the partition walls 5 are comparatively dense to have high mechanical strength. Furthermore, in the honeycomb catalyst body 100, the thickness of the projecting portion 9 is from 30 to 140% of the thickness of the partition wall 5, and thereby it is possible to suppress an initial pressure loss lower while ensuring the strength of the honeycomb catalyst body 100 (the plugged honeycomb structure 10). Furthermore, in the honeycomb catalyst body 100, the amount of the catalyst loaded onto the partition walls 5 in the cross section perpendicular to the extending direction of a cell is 40% or less of the total amount of the catalysts loaded onto the plugged honeycomb structure 10. Additionally, the amount of the catalyst to be loaded onto the partition walls 5 is smaller than the amount of the catalyst to be loaded onto the projecting portions 9. Consequently, the honeycomb catalyst body 100 has less pressure loss. It is to be noted that when the amount is "smaller than the amount of the catalyst to be loaded onto the projecting portions 9", it is meant that the amount is smaller than a total of an amount of the catalyst to be loaded onto the inflow cell side projecting portions 9a and an amount of the catalyst to be loaded onto the outflow cell side projecting portions 9b.

The honeycomb catalyst body 100 reduces and purifies $NO_x$ in the exhaust gas by the selective reduction catalyst loaded onto the inflow cell side projecting portions 9a with a use of ammonia generated from urea supplied from an urea supply nozzle disposed at a portion (on an upstream side) prior to the honeycomb catalyst body 100. In this case, to prevent surplus ammonia (the ammonia not being used in the reduction of $NO_x$) from being discharged to the atmosphere, ammonia is oxidized and detoxified by the ammonia slip preventing catalyst loaded onto the outflow cell side projecting portions 9b. In this way, the honeycomb catalyst body 100 can reduce $NO_x$ in the exhaust gas to suitably detoxify the exhaust gas. Moreover, in the honeycomb catalyst body 100, the exhaust gas having allowed to flow into the inflow cells 4a passes through the partition walls 5, and particulate matters in the exhaust gas are collected at the time of passing through this partition walls 5.

Here, when the catalyst is loaded onto a filter structure (the plugged honeycomb structure) capable of collecting the particulate matters (e.g., in the case of a filter disclosed in Patent Document 2), there have heretofore been employed measures to apply the catalyst to pores in the partition walls of the filter structure and load the catalyst thereonto. However, in such a method, when the amount of the catalyst is increased for the purpose of improving the purification performance of the honeycomb catalyst body to be obtained, the pores in the partition walls are clogged or noticeably narrowed by the catalyst, so that the porosity of each partition wall is rapidly reduced. Therefore, there has been a problem that the pressure loss of the filter (the honeycomb catalyst body) excessively increases. Therefore, when the amount of the catalyst is increased, there are employed measures to increase the porosity of each of the partition walls of the filter and ensure a space where the catalyst is loaded so that the pressure loss does not increase even when a large amount of the catalyst is loaded. However, when the porosity of each partition wall is increased, the mechanical strength of the filter deteriorates. Consequently, there has been a limit to the measures to increase the porosity of each of the partition walls in consideration of actual use.

Moreover, when a catalyst layer of the ammonia slip preventing catalyst (ASC) is formed on a catalyst layer of the selective reduction catalyst (SCR) (e.g., when the catalyst layers are formed as in the filter disclosed in Patent Document 2), the catalyst layers are very thin. Therefore, a distance which the exhaust gas can come in contact with the catalyst is short, and, in particular, there is a failure that removal of ammonia cannot sufficiently be performed when a flow rate of the exhaust gas is large. Furthermore, since the catalysts are applied onto the same partition wall, it is difficult to completely separate the catalyst layer of the SCR from the catalyst layer of the ASC. As a result, ammonia originally to be used for the $NO_x$ purification is oxidized by the ammonia slip preventing catalyst, and $NO_x$ purification performance to be expected might not be obtained. In other words, when any laminated catalyst layers are not formed as in the honeycomb catalyst body of the present invention, it is possible to separate functions. That is, when portions loaded with the selective reduction catalyst (SCR) are disposed away from portions loaded with the ammonia slip preventing catalyst via the partition walls, ammonia required for the $NO_x$ purification can securely be supplied to the selective reduction catalyst (SCR). Moreover, only surplus ammonia can be purified by the ammonia slip preventing catalyst (ASC). Furthermore, in a case where the catalyst layer of the SCR is laminated on the catalyst layer of the ASC, the exhaust gas is purified only the time of passing through the partition walls, but the honeycomb catalyst body of the present invention has the advantage that the purification is not limited to the time of passing through the partition walls. In consequence, when the exhaust gas flows through the through channels (the cells), the exhaust gas is purified by the catalyst loaded onto the projecting portions, and thereby the purification performance is maintained even when the flow rate of the exhaust gas is large.

Furthermore, in a through channel direction, there appears a distribution of a flow speed of the fluid (the exhaust gas) passing through the partition walls of the filter. Therefore, the catalyst loaded onto a portion through which a large amount of the exhaust gas flows deteriorates quickly. Moreover, since the flow speed distribution of the exhaust gas does not change as long as the same use conditions, it is difficult to effectively utilize the other portions (portions other than the portions through which the large amount of the exhaust gas flows).

Therefore, the honeycomb catalyst body of the present invention is divided into portions onto which the large amount of the catalyst is loaded and which mainly assume a catalyst function and portion which collect the particulate matters mainly as a filter (the portions are disposed in separate regions). According to such a constitution, it is possible to avoid the excessive increase of the pressure loss caused by loading the catalyst onto pore surfaces of the partition walls or to avoid the deterioration of the mechanical strength of the filter (the honeycomb catalyst body) caused by increasing the porosity for the purpose of suppressing this increase.

FIG. 1 is a perspective view schematically showing one embodiment of the honeycomb catalyst body of the present invention. FIG. 2 is a plan view schematically showing one end face in the one embodiment of the honeycomb catalyst body of the present invention. FIG. 3 is a cross sectional view schematically showing a cross section parallel to an extending direction of the cell in the one embodiment of the honeycomb catalyst body of the present invention.

[1-1] Plugged Honeycomb Structure:

The porosity of the partition wall 5 is from 40% to 70%, preferably from 40 to 65%, and further preferably from 40 to 60%. When the porosity of the partition wall 5 is within the above range, it is possible to suppress the increase of the pressure loss while ensuring a canning strength. When the porosity of the partition wall 5 is smaller than 40%, a passing resistance increases when the exhaust gas passes through the partition wall 5 to increase the pressure loss. When the porosity is in excess of 70%, the strength of the partition wall 5 deteriorates, and thereby the partition walls might be broken at canning. For example, when the porosity is 75%, an isostatic strength of the plugged honeycomb structure is 0.3 MPa and is very low.

The porosity of the partition wall 5 is a value measured by image analysis. Specifically, SEM photographs of a plurality of view fields of the partition walls of the plugged honeycomb structure in the cross section perpendicular to the extending direction of the cell are arbitrarily photographed by a scanning type electron microscope (SEM). The number of the photographed view fields is at least three. Moreover, in the one view field, a vertical size×a horizontal size is "p×p", when a size of one cell (a cell pitch) is "p". Next, each photographed image is binarized by the image analysis to divide into a cavity portion (i.e., a pore portion) and portions other than the cavity. Next, a ratio of an area corresponding to the cavity portion in each image is calculated, and an average value is obtained. In this way, the porosity of each of the partition walls is calculated.

An average pore diameter of the partition walls 5 is preferably 25 μm or less, further preferably from 7 to 25 μm, especially preferably from 8 to 24 μm, and most preferably from 9 to 23 μm. When the above average pore diameter is within the above range, it is possible to suppress the increase of the pressure loss while ensuring the function as the filter (a particulate matter collecting performance). When the average pore diameter of the partition walls 5 is smaller than 7 μm, the passing resistance increases when the exhaust gas passes through the partition walls 5, and thereby the pressure loss might increase. When the average pore diameter is in excess of 25 μm, the collecting performance of ash and the particulate matters might deteriorate. The average pore diameter of the partition walls 5 is a value measured by the image analysis in the same manner as in the porosity of each of the partition walls.

A thickness of the partition wall 5 is preferably from 64 to 508 μm, further preferably from 89 to 381 μm, and especially preferably from 110 to 305 μm. When the thickness of each partition wall is within the above range, there are the advantages that the strength of the honeycomb structure is maintained and that the increase of the pressure loss is suppressed. When the thickness of the partition wall 5 is smaller than 64 μm, the strength of the honeycomb structure may deteriorate. When it is in excess of 508 μm, it may cause a failure that the pressure loss is high. The thickness of the partition wall 5 is a value measured by a method of observing the cross section parallel to a central axis of the honeycomb catalyst body 100 by a microscope.

A value (L/D) calculated by a formula: (a length L of the honeycomb catalyst body in a central axis direction/a diameter D of the end face of the honeycomb catalyst body) is preferably from 0.5 to 2, further preferably from 0.6 to 1.7, and especially preferably from 0.7 to 1.6. When the above value (L/D) is within the above range, ring cracks can be suppressed.

A shape of the cell 4 is a quadrangular shape in a cross section perpendicular to the extending direction of the cell. There is not any restriction on the shape of the cell 4, and examples of the shape include polygonal shapes such as a triangular shape and an octagonal shape, a round shape, and an oval shape, in addition to the quadrangular shape.

There is not any restriction on a thickness of the peripheral wall 7. The thickness of the peripheral wall 7 is preferably from 0.1 to 8 mm, further preferably from 0.2 to 7 mm, and especially preferably from 0.3 to 6 mm. When the thickness of the peripheral wall 7 is within the above range, it is possible to reduce a heat stress generated by a difference in heat capacity between the peripheral wall 7 and the partition wall 5 while ensuring the strength of the peripheral wall 7.

There is not any restriction on a shape of the plugged honeycomb structure 10 (the honeycomb catalyst body 100). The shape is preferably a cylindrical shape, a cylindrical shape with an oval bottom surface, a cylindrical shape with a bottom surface having a polygonal shape such as a quadrangular shape, a pentangular shape or a hexagonal shape, or the like, and especially preferably a cylindrical shape. Moreover, there is not any restriction on a size of the plugged honeycomb structure 10 (the honeycomb catalyst body 100). A length of the structure in the extending direction of the cell is preferably from 50 to 381 mm. Moreover, when an outer shape of the plugged honeycomb structure 10 (the honeycomb catalyst body 100) is, for example, a cylindrical shape, a diameter of a bottom surface is preferably from 50 to 381 mm.

Each of the partition walls 5 and the peripheral wall 7 preferably contains a ceramic material as a main component. A material of each of the partition walls 5 and the peripheral wall 7 is, for example, preferably at least one selected from the following group. That is, the material is preferably at least one selected from the group consisting of silicon carbide, a silicon-silicon carbide composite material, cordierite, mullite, alumina, spinel, a silicon carbide-cordierite composite material, lithium aluminum silicate, and aluminum titanate. Among these materials, cordierite is preferable. When the material is cordierite, it is possible to obtain the plugged honeycomb structure having less thermal expansion coefficient and excellent heat shock resistance. The material of the partition walls 5 is preferably the same as that of the peripheral wall 7. It is to be noted that the material of the partition walls 5 may be different from that of the peripheral wall 7. When the walls "contain the ceramic material as the main component", it is meant that a content of the ceramic material is 90 mass % or more of the whole material.

The projecting portions 9 are the porous portions projecting so as to extend from the partition walls 5 into the inflow cells 4a being the cells provided with the outflow side plugged portions 8b and into the outflow cells 4b being the cells provided with the inflow side plugged portions 8a, and being formed integrally with the partition walls 5. A shape of the projecting portion extending into the inflow cell may be the same as that of the projecting portion extending into the outflow cell, or may be different therefrom. That is, for example, the projecting portion extending into the inflow cell may be a partition wall defining a small cell described later, and the projecting portion extending into the outflow cell may be in the form of a protrusion.

Figure 4:
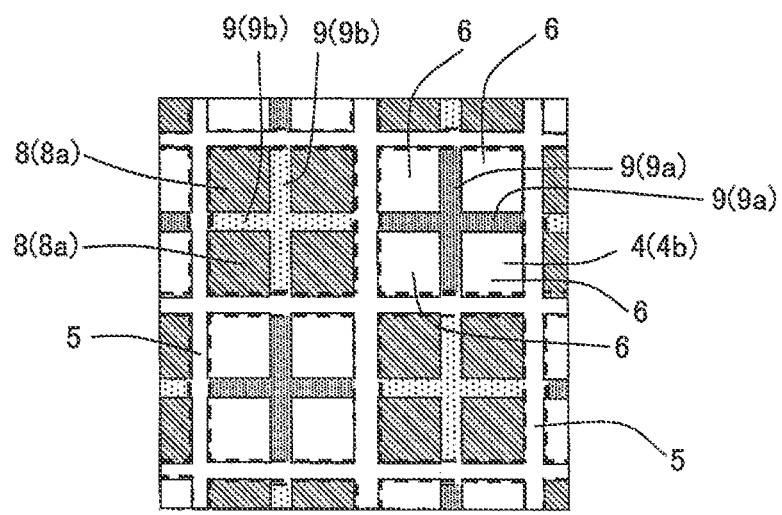
FIG. 4 is a plan view schematically showing an enlarged part of the one end face in the one embodiment of the honeycomb catalyst body of the present invention.

The projecting portion 9 (9a or 9b) is preferably a partition wall defining the cell 4 to form a plurality of cells (small cells 6 (see FIG. 4)) as in the honeycomb catalyst body 100 shown in FIG. 1 to FIG. 4. In such a honeycomb catalyst body 100, the projecting portions 9 have the above constitution, so that the strength of the honeycomb structure can be enhanced, and the honeycomb catalyst body can be manufactured without changing conventional manufacturing steps and jigs. FIG. 4 is a plan view schematically showing an enlarged region P of part of the one end face in the one embodiment of the honeycomb catalyst body of the present invention. Each portion surrounded with a broken line shown in FIG. 4 shows the cell 4 defined by the partition walls 5. Each of the projecting portions 9 projects so as to extend from the partition wall 5 into the cell 4. FIG. 4 shows an example where each of the cells 4 is defined by partition walls constituted of the projecting portions 9 to form the four small cells 6. In the honeycomb catalyst body 100 of the one embodiment of the honeycomb catalyst body of the present invention, the amount of the catalyst loaded onto the partition walls 5 in the cross section perpendicular to the extending direction of the cells 4 is 40% or less of the total amount of the catalysts loaded onto the plugged honeycomb structure 10. Moreover, the catalyst is positively loaded onto the partition walls (the projecting portions 9) defining the small cells 6.

Figure 5:
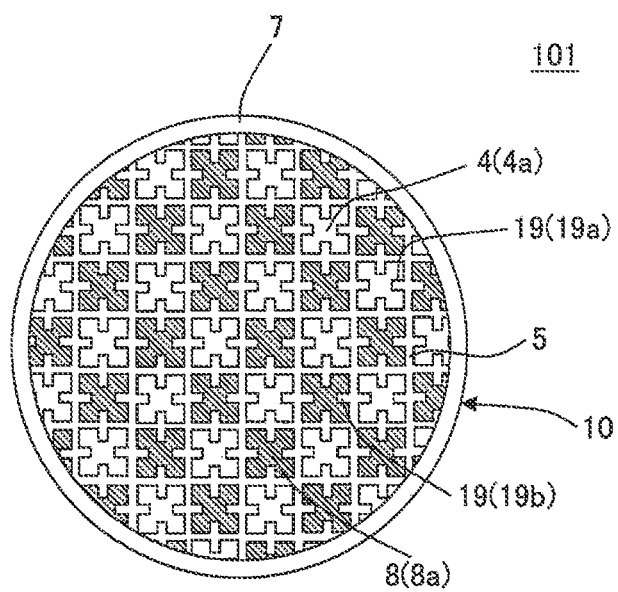
FIG. 5 is a plan view schematically showing one end face in another embodiment of the honeycomb catalyst body of the present invention.

Moreover, each projecting portion is preferably in the form of a protrusion (a protrusion-like projecting portion 19 (19a or 19b)) projecting from the surface of a partition wall 5 as in a honeycomb catalyst body 101 shown in FIG. 5. In this way, the projecting portion is in the form of the protrusion, and thereby the initial pressure loss can be lower. The protrusion-like projecting portion 19a is the projecting portion extending into an inflow cell 4a of a plugged honeycomb structure 10, and the protrusion-like projecting portion 19b is the projecting portion extending into an outflow cell 4b of the plugged honeycomb structure 10.

There is not any restriction on the number, a size or the like of the protrusion-like projecting portions 19. For example, the honeycomb catalyst body 101 shown in FIG. 5 is an example where the one protrusion-like projecting portion 19 extends from each partition wall, and the four protrusion-like projecting portions 19 extend into one cell 4. According to such a constitution, it can be manufactured by a simple change of a jig used in the conventional manufacturing steps.

A thickness of each projecting portion is from 30 to 140%, preferably from 30 to 130%, and further preferably from 30 to 120% of a thickness of each partition wall. When the thickness of the projecting portion is within the above range, it is possible to suppress the initial pressure loss lower while ensuring the strength of the plugged honeycomb structure. When the thickness of the projecting portion is smaller than 30%, the strength of the plugged honeycomb structure deteriorates, and thereby the plugged honeycomb structure is broken at canning. When it is in excess of 140%, the initial pressure loss may increase. It is to be noted that the thickness of the projecting portion means a thickness of the thickest portion of a partition wall, when the projecting portion is the partition wall defining the cell to form a plurality of cells. Moreover, when the projecting portion is in the form of the protrusion, the thickness of the projecting portion means a maximum width of the above projecting portion in a cross section perpendicular to an extending direction of the cell.

It is to be noted that the thickness of the projecting portion extending into the inflow cell of the plugged honeycomb structure (an inflow cell side projecting portion) may be different from the thickness of the projecting portion extending into the outflow cell of the plugged honeycomb structure (an outflow cell side projecting portion). Moreover, the thickness of the inflow cell side projecting portion may be the same as that of the outflow cell side projecting portion.

As porosity and an average pore diameter of each projecting portions, it is possible to employ ranges similar to those of the above-mentioned porosity and average pore diameter of each partition walls, and it is preferably that the porosity and average pore diameter of each projecting portions are the same as those of the partition walls.

An example of a material of the plugged portions (the inflow side plugged portions and the outflow side plugged portions) is the same as that of the partition walls 5, and it is preferable to use the same material as in the partition walls 5.

A cell density of the plugged honeycomb structure 10 is calculated as follows, when each of the projecting portions is in the form of a protrusion. That is, in the cross section perpendicular to the extending direction of the cell, a line segment connecting start points of the opposed protrusion-like projecting portions to each other is assumed (when a plurality of line segments can be drawn, the longest line segment is employed), and a virtual partition wall is considered to be present at a position of this line segment, to calculate the cell density. It is to be noted that when each projecting portion is in the form of the wall, a small cell is regarded as one cell, to calculate the cell density.

The cell density of the plugged honeycomb structure 10 is preferably from 15.5 to 93 cells/cm$^2$, further preferably from 31 to 77.5 cells/cm$^2$, and especially preferably from 46.5 to 62 cells/cm$^2$. When the above cell density is within the above range, there is the advantage that the increase of the pressure loss can be suppressed while ensuring the strength of the honeycomb structure. When the cell density of the plugged honeycomb structure 10 is smaller than 15.5 cells/cm$^2$, honeycomb strength deteriorates, which might cause a failure that the plugged honeycomb structure breaks at canning. When it is in excess of 93 cells/cm$^2$, the pressure loss increases, which might cause a failure that fuel efficiency deteriorates.

[1-2] Catalyst:

The amount of the catalyst loaded onto the partition walls 5 in the cross section perpendicular to the extending direction of the cells 4 of the plugged honeycomb structure 10 is 40%, or less of the total amount of the catalysts loaded onto the plugged honeycomb structure 10. In this way, in the honeycomb catalyst body 100, a larger amount of the catalyst is loaded onto the projecting portions 9 than onto the partition wall 5. The amount of the catalyst to be applied to the partition walls 5 is 40% or less, preferably 30% or less, and further preferably 20% or less of the total amount of the catalysts to be applied to the honeycomb structure 10. When the amount of the catalyst to be applied to the partition walls 5 is in excess of 40% of the total amount of the catalysts to be applied to the honeycomb structure 10, the pressure loss increases in a case where suitable purification efficiency is maintained. Moreover, a performance of the plugged honeycomb structure 10 (a pressure loss increase prevention effect) is the best in a state where a catalyst coat is not substantially present on the partition walls 5 (the catalyst is not substantially loaded onto the partition walls 5). That is, when the catalyst coat is not substantially present on the partition walls 5, it is possible to suppress the increase of the pressure loss because through channels of the exhaust gas passing through the partition walls are sufficiently ensured. In this case, "the state where the catalyst coat is not substantially present" means a case where the amount of the catalyst applied to (loaded onto) the partition walls 5 is 5% or less of the total amount of the catalysts applied to (loaded onto) the plugged honeycomb structure 10 (including a case where the catalyst is not loaded onto the partition walls 5).

The amount of the catalyst loaded onto the partition walls and the projecting portions (the catalyst amount) is measured by the image analysis in the same manner as in a measuring method of the porosity. That is, "the amount of the catalyst" is a size of an area of the catalyst calculated by the image analysis. Specifically, firstly, in an arbitrary cross section perpendicular to a central axis (the extending direction of the cell) of the honeycomb catalyst body, the image analysis is performed, to binarize a substrate portion corresponding to the partition walls and the projecting portions, and a portion corresponding to the catalyst. Next, an area of the catalyst loaded onto the projecting portions and an area of the catalyst loaded onto the partition walls are calculated as the catalyst amounts in the respective portions.

In this way, in the honeycomb catalyst body of the present invention, the portions (the partition walls) having less amount of the loaded catalyst and functioning as filters to collect particulate matters and the portions (the projecting portions) onto which a large amount of the catalyst is positively loaded and which purify harmful substances in the exhaust gas are present in separate regions, respectively. Therefore, for the partition walls functioning as the filters, it is not necessary to consider that the catalyst is loaded as in the conventional honeycomb catalyst body, and thereby the porosity can be small. As a result, the mechanical strength of the honeycomb catalyst body can be enhanced.

[2] Manufacturing Method of Honeycomb Catalyst Body of the Present Invention:

The honeycomb catalyst body of the present invention can be manufactured as follows. That is, firstly, a kneaded material obtained by kneading a forming raw material containing a ceramic raw material is extruded into a honeycomb shape to prepare a honeycomb formed body (a honeycomb formed body preparing step). Next, a plugging material is filled into open frontal areas of cells of the prepared honeycomb formed body to prepare a plugged honeycomb formed body (a plugging step). Next, the prepared plugged honeycomb formed body is fired, to prepare a plugged honeycomb structure in which porous plugged portions are provided at one end of each of the predetermined cells and another end of each of the remaining cells (a plugged honeycomb structure preparing step). Next, the catalyst is loaded onto the prepared plugged honeycomb structure to prepare the honeycomb catalyst body (a catalyst loading step).

According to such a honeycomb catalyst body manufacturing method, the honeycomb catalyst body of the present invention can suitably be manufactured.

[2-1] Honeycomb Formed Body Preparing Step:

In the present step, the kneaded material obtained by kneading the forming raw material is extruded into the honeycomb shape to obtain the honeycomb formed body. The open frontal areas of the predetermined cells in one end face of the obtained honeycomb formed body are plugged, and then fired. In this way, the plugged honeycomb structure can be prepared.

The forming raw material is preferably a ceramic raw material to which a dispersion medium and an additive have been added. Examples of the additive include an organic binder, a pore former, and a surfactant. An example of the dispersion medium is water.

The ceramic raw material is preferably at least one selected from the group consisting of silicon carbide, a silicon-silicon carbide composite material, a cordierite forming raw material, mullite, alumina, spinel, a silicon carbide-cordierite composite material, lithium aluminum silicate, and aluminum titanate. Among these materials, the cordierite forming raw material having less thermal expansion coefficient and excellent heat shock resistance is preferable.

Examples of the organic binder include methylcellulose, hydroxypropoxyl cellulose, hydroxyethyl cellulose, carboxymethyl cellulose, and polyvinyl alcohol. Among these binders, methylcellulose and hydroxypropoxyl cellulose are preferably used together. A content of the organic binder is preferably from 0.2 to 2 parts by mass to 100 parts by mass of the ceramic raw material.

There is not any restriction on the pore former, as long as the pores are formed after the firing. Examples of the pore former include starch, resin balloons, a water-absorbing resin, and silica gel. A content of the pore former is preferably from 5 to 15 parts by mass to 100 parts by mass of the ceramic raw material.

As the surfactant, ethylene glycol, dextrin, fatty acid soap, polyalcohol or the like can be used. One of these surfactants may be used alone, or a combination of two or more of the surfactants may be used. A content of the surfactant is preferably from 0.1 to 2 parts by mass to 100 parts by mass of the ceramic raw material.

A content of the dispersion medium is preferably from 10 to 30 parts by mass to 100 parts by mass of the ceramic raw material.

A porous substrate having a desirable porosity and average pore diameter can be obtained by adjusting particle diameters and an amount of the ceramic raw material (aggregate particles) for use, and particle diameters and an amount of the pore former to be added.

There is not any restriction on a method of kneading the forming raw material to form the kneaded material. An example of the method is a method using a kneader, a vacuum clay kneader or the like. The extrusion can be performed by using a die having a desirable cell shape, partition wall thickness and cell density. A material of the die is preferably a cemented carbide which hardly wear away.

[2-2] Plugging Step:

In the present step, the plugging material is filled into the open frontal areas of the cells of the prepared honeycomb formed body to prepare the plugged honeycomb formed body.

As the forming raw material containing the ceramic raw material included in the plugging material, it is possible to use the same as the forming raw material containing the ceramic raw material being the raw material of the kneaded material to form the honeycomb formed body.

As a method of filling the plugging material into the open frontal areas of the cells, a heretofore known method can suitably be employed. For example, firstly, a mask is attached to one end face of the honeycomb formed body. Next, holes are made in portions of the mask which cover the predetermined cells, by known means such as laser. Next, the above plugging material is filled into one end of each predetermined cell of the honeycomb formed body at which the holes are made in the mask. Next, a mask is attached to another end face of the honeycomb formed body. Next, holes are made in portions of the mask which cover the remaining cells, by known means such as the laser. Next, the above plugging material is filled into another end of each remaining cell of the honeycomb formed body at which the hoes are made in the mask. It is to be noted that the cordierite forming raw material is obtained by blending respective components so as to obtain a theoretical composition of cordierite crystals. The above cordierite forming raw material is specifically obtained by blending a silica source component, a magnesia source component, an alumina source component and the like.

[2-3] Plugged Honeycomb Structure Preparing Step:

A firing temperature can suitably be determined in accordance with the material of the honeycomb formed body. When the material of the honeycomb formed body is, for example, cordierite, the firing temperature is preferably from 1380 to 1450° C., and further preferably from 1400 to 1440° C. Moreover, a firing time is preferably from about three to ten hours.

The honeycomb formed body may be dried prior to the firing. There is not any restriction on a drying method. Examples of the drying method include hot air drying, microwave drying, dielectric drying, reduced-pressure drying, vacuum drying, and freeze-drying. Above all, the dielectric drying, the microwave drying, the hot air drying or any combination of these methods is preferably performed. Moreover, drying conditions are preferably a drying temperature of 30 to 150° C. and a drying time of one minute to two hours.

It is to be noted that the honeycomb formed body may be fired to obtain a honeycomb fired body, and then the plugging material may be filled into ends of predetermined cells of the honeycomb fired body on one end face side.

[2-4] Catalyst Loading Step:

Next, the plugged honeycomb structure is immersed into a catalyst slurry containing the selective reduction catalyst in order from one end side of the plugged honeycomb structure, and simultaneously, air is supplied into the above plugged honeycomb structure from another end face side of the plugged honeycomb structure. In this way, a catalyst coating layer made of the above catalyst slurry is formed on the projecting portions projecting into the inflow cells (the inflow cell side projecting portions) so that the partition walls are not coated with the catalyst as much as possible. Afterward, the air is sprayed into the cells of the plugged honeycomb structure from the above another end face side, to blow out the catalyst slurry penetrating into the pores of the partition walls.

Next, the plugged honeycomb structure is immersed into a catalyst slurry containing the ammonia slip preventing catalyst in order from another end side of the plugged honeycomb structure, and simultaneously, the air is supplied into the above plugged honeycomb structure from the one end face side of the plugged honeycomb structure. In this way, the catalyst coating layer made of the above catalyst slurry is formed on the projecting portions projecting into the outflow cells (the outflow cell side projecting portions) so that the partition walls are not coated with the catalyst as much as possible. Afterward, the air is sprayed into the cells of the plugged honeycomb structure from the above one end face side, to blow out the catalyst slurry penetrating into the pores of the partition walls.

Afterward, the catalyst coating layer formed on this plugged honeycomb structure is dried and fired, thereby manufacturing the honeycomb catalyst body.

Moreover, the catalyst may be loaded as follows. That is, firstly, the plugged honeycomb structure is immersed into provisional filling slurry containing a compound which is volatilized by applying heat thereto, prior to the application of the catalyst slurry. In this way, the above provisional filling slurry is filled into the pores of the partition walls of the plugged honeycomb structure.

Next, the respective catalyst slurries (the catalyst slurry containing the selective reduction catalyst and the catalyst slurry containing the ammonia slip preventing catalyst) are filled into the inflow cells and into the outflow cells from one end face and another end face of the plugged honeycomb structure, respectively. In this way, the catalyst coating layers made of the above catalyst slurries are formed on the surfaces of the inflow cells and the outflow cells, the surfaces of the projecting portions projecting into these inflow cells and outflow cells and the surfaces of the pores of the projecting portions.

Next, the plugged honeycomb structure is dried and fired, to volatilize the above provisional filling slurry filled into the pores of the partition walls and form the pores in the partition walls, and then air is sprayed into the cells from the end face of the plugged honeycomb structure, to blow out the catalyst slurry attached to the partition wall surfaces. In this way, the honeycomb catalyst body can also be prepared.

EXAMPLES

Hereinafter, the present invention will specifically be described based on examples, but the present invention is not limited to these examples.

Example 1

As cordierite forming raw materials, alumina, aluminum hydroxide, kaolin, talc and silica were used. To 100 parts by mass of this cordierite forming raw material, 10 parts by mass of a pore former, 20 parts by mass of a dispersion medium, 1 part by mass of an organic binder and 0.5 part by mass of a dispersant were added, respectively, and the resultant were mixed and kneaded to prepare a kneaded material. As the dispersion medium, water was used, and as the pore former, cokes having an average particle diameter of 12 µm were used. As the organic binder, hydroxypropyl methylcellulose was used, and as the dispersant, ethylene glycol was used.

Next, the kneaded material was extruded by using a predetermined die, to prepare a honeycomb formed body having partition walls defining a plurality of cells extending through the honeycomb formed body from one end face to another end face, and projecting portions projecting so as to extend from this partition walls into cells and being formed integrally with the partition walls. The projecting portions were partition walls defining each cell defined by the partition walls to further form four cells (small cells). In the honeycomb formed body, a cell shape in a cross section perpendicular to an extending direction of the cell was a quadrangular shape, and the whole shape was a columnar. Next, the prepared honeycomb formed body was dried by a microwave drier, and further completely dried by a hot air drier to obtain a dried honeycomb formed body (the honeycomb dried body). Afterward, both ends of the honeycomb dried body were cut to obtain a predetermined dimension. Next, a mask was attached to one end face of the honeycomb dried body. At this time, all open frontal areas of the cells were closed with the mask. Next, laser was irradiated thereto, to make holes in predetermined portions of the mask (i.e., portions closing the predetermined cells).

Next, an end of this honeycomb dried body to which the mask was attached (one end) was immersed into plugging slurry, to fill the above plugging material slurry into the one end of each predetermined cell. The plugging material slurry made of the same raw material as the above kneaded material was used.

Next, a mask was attached to another end face of the honeycomb dried body. At this time, all open frontal areas of the cells were closed with the mask. Next, laser was irradiated thereto, to make holes in predetermined portions of the mask (i.e., portions closing the remaining cells).

Next, an end of this honeycomb dried body to which the mask was attached (the another end) was immersed into the plugging slurry, to fill the above plugging material slurry into another end of each remaining cell.

Next, the honeycomb dried body, into which the above plugging material slurry was filled, was dried by a hot air drier. Afterward, the honeycomb dried body was fired at 1410 to 1440° C. for five hours. In this way, the plugged honeycomb structure was prepared.

The obtained plugged honeycomb structure had a diameter of 177.8 mm, and a length of 254 mm in a central axis direction. Moreover, a volume was 6.31 liters. A value (L/D) of a ratio of a length L in the central axis direction to a diameter D of the plugged honeycomb structure was 1.43. A cell density of the plugged honeycomb structure was 46.5 cells/cm$^2$. A thickness of each partition wall was 0.305 mm. A porosity of the partition wall was 48%. An average pore diameter of the partition walls was 12 μm. A thickness of each projecting portion was 0.305 mm. A porosity of each projecting portion was 48%. An average pore diameter of the projecting portions was 12 μm. The results are shown in Table 1 or Table 5.

Next, respective catalysts (a selective reduction catalyst and an ammonia slip preventing catalyst) were loaded onto the obtained plugged honeycomb structure. Specifically, the plugged honeycomb structure was immersed into the catalyst slurry containing the selective reduction catalyst in order from one end of the plugged honeycomb structure, and simultaneously, air was supplied into the above plugged honeycomb structure from another end face side of the plugged honeycomb structure. Afterward, air was sprayed into the cells from another end face side of the plugged honeycomb structure, thereby blowing out the catalyst penetrating into the partition walls.

Next, the plugged honeycomb structure was immersed into the catalyst slurry containing the ammonia slip preventing catalyst in order from another end of the plugged honeycomb structure, and simultaneously, the air was supplied into the above plugged honeycomb structure from the one end face side of the plugged honeycomb structure. Afterward, the air was sprayed into the cells from another end face side of the plugged honeycomb structure, thereby blowing out the catalyst penetrating into the partition walls.

In this way, catalyst coating layers were formed on the surfaces of projecting portions projecting into inflow cells and of projecting portions projecting into outflow cells and the surfaces of pores. Afterward, the catalyst coating layers of the plugged honeycomb structure were dried and fired to obtain a honeycomb catalyst body.

Afterward, on an upstream side of the obtained honeycomb catalyst body, a DOC catalyst body loaded with a diesel oxidation catalyst (DOC) (described as "DOC" in Table 1) was disposed, and an urea supply nozzle was interposed between the above honeycomb catalyst body and the DOC catalyst body, to prepare an exhaust gas purifying device. A length of the exhaust gas purifying device excluding a piping was 294 mm, an initial pressure loss of the whole exhaust gas purifying device was 3.69 kPa, and a pressure loss with soot was 9.06 kPa. Moreover, a DOC total amount of the whole exhaust gas purifying device was 340 g, and an SCR total amount was 568 g.

The DOC catalyst body had a diameter of 143.8 mm, and a length of 40 mm in a central axis direction. Moreover, a volume was 0.65 liter. The initial pressure loss and the pressure loss with the soot were 0.3 kPa. An amount of a loaded catalyst was 130 g.

In the obtained honeycomb catalyst body (described as "a hybrid DPF" in Table 1), an amount of the catalyst loaded onto partition walls in a cross section perpendicular to an extending direction of the cell was 5% or less of the total amount of the catalysts loaded onto a honeycomb catalyst body (described as "a partition wall coat ratio (%)" in Table 5). Additionally, "DOC (ASC)" in Example 1 is the ammonia slip preventing catalyst.

TABLE 1

|  | Example 1 | | | | Example 2 | | | |
|  | | Hybrid DPF | | | | Hybrid DPF | | |
|  | DOC | Partition wall | SCR | DOC (ASC) | DOC | Partition wall | SCR | DOC (ASC) |
| --- | --- | --- | --- | --- | --- | --- | --- | --- |
| Dia. (mm) | 143.8 | 177.8 | | | 143.8 | 177.8 | | |
| Length (mm) | 40 | 254 | | | 40 | 254 | | |
| Volume (L) | 0.65 | 6.31 | | | 0.65 | 6.31 | | |
| Initial pressure loss (kPa) | 0.3 | 3.39 | | | 0.3 | 3.32 | | |
| Pressure loss with soot (kPa) | 0.3 | 8.76 | | | 0.3 | 12.17 | | |
| Loaded amount of catalyst (g) | 130 | 38 | 540 | 200 | 130 | 311 | 341 | 126 |
| Length of exhaust gas purifying device (mm) | | 294 | | | | 294 | | |
| Device initial pressure loss (kPa) | | 3.69 | | | | 3.62 | | |
| Device pressure loss with soot (kPa) | | 9.06 | | | | 12.47 | | |
| DOC total amount (g) | | 340 | | | | 340 | | |
| SCR total amount (g) | | 568 | | | | 568 | | |
| Isostatic strength (MPa) | — | 10.9 | | | — | 10.9 | | |
| Collecting efficiency (%) | — | 99.9 | | | — | 99.9 | | |

|  | Example 3 | | | | Example 4 | | | |
|  | | Hybrid DPF | | | | Hybrid DPF | | |
|  | DOC | Partition wall | SCR | DOC (ASC) | DOC | Partition wall | SCR | DOC (ASC) |
| --- | --- | --- | --- | --- | --- | --- | --- | --- |
| Dia. (mm) | 143.8 | 177.8 | | | 143.8 | 177.8 | | |
| Length (mm) | 40 | 254 | | | 40 | 254 | | |

TABLE 1-continued

| | | | | | | | | |
|---|---|---|---|---|---|---|---|---|
| Volume (L) | 0.65 | | 6.31 | | 0.65 | | 6.31 | |
| Initial pressure loss (kPa) | 0.3 | | 3.52 | | 0.3 | | 1.85 | |
| Pressure loss with soot (kPa) | 0.3 | | 10.66 | | 0.3 | | 7.22 | |
| Loaded amount of catalyst (g) | 130 | 38 | 540 | 200 | 130 | 38 | 540 | 200 |
| Length of exhaust gas purifying device (mm) | | 294 | | | | 294 | | |
| Device initial pressure loss (kPa) | | 3.82 | | | | 2.15 | | |
| Device pressure loss with soot (kPa) | | 10.96 | | | | 7.52 | | |
| DOC total amount (g) | | 340 | | | | 340 | | |
| SCR total amount (g) | | 568 | | | | 568 | | |
| Isostatic strength (MPa) | — | | 13.7 | | — | | 3.7 | |
| Collecting efficiency (%) | — | | 99.5 | | — | | 99.9 | |

"Usual" in a column of "structure" in Table 5 means a honeycomb catalyst body in which a catalyst is also loaded onto pore surfaces of partition walls and which does not have any projecting portions. "Hybrid wall" means that the honeycomb catalyst body has the projecting portions and that the projecting portions are partition walls further defining each cell to further define a plurality of cells (small cells).

TABLE 2

| | Example 5 | | | | Example 6 | | | |
|---|---|---|---|---|---|---|---|---|
| | | Hybrid DPF | | | | Hybrid DPF | | |
| | DOC | Partition wall | SCR | DOC (ASC) | DOC | Partition wall | SCR | DOC (ASC) |
| Dia. (mm) | 143.8 | | 177.8 | | 143.8 | | 177.8 | |
| Length (mm) | 40 | | 254 | | 40 | | 254 | |
| Volume (L) | 0.65 | | 6.31 | | 0.65 | | 6.31 | |
| Initial pressure loss (kPa) | 0.3 | | 3.68 | | 0.3 | | 3.13 | |
| Pressure loss with soot (kPa) | 0.3 | | 10.52 | | 0.3 | | 7.53 | |
| Loaded amount of catalyst (g) | 130 | 38 | 540 | 200 | 130 | 38 | 540 | 200 |
| Length of exhaust gas purifying device (mm) | | 294 | | | | 294 | | |
| Device initial pressure loss (kPa) | | 3.98 | | | | 3.43 | | |
| Device pressure loss with soot (kPa) | | 10.82 | | | | 7.83 | | |
| DOC total amount (g) | | 340 | | | | 340 | | |
| SCR total amount (g) | | 568 | | | | 568 | | |
| Isostatic strength (MPa) | — | | 11.4 | | — | | 10.7 | |
| Collecting efficiency (%) | — | | 99.9 | | — | | 90.1 | |

TABLE 3

| | Comp. Ex. 1 | | | | Comp. Ex. 2 | | | Comp. Ex. 3 | | |
|---|---|---|---|---|---|---|---|---|---|---|---|
| | | | | | | SCR loading | | | Hybrid DPF | |
| | | | | | | | | | Partition | | DOC |
| | DOC | DPF | SCR | ASC | DOC | DPF | ASC | DOC | wall | SCR | (ASC) |
| Dia. (mm) | 143.8 | 143.8 | 143.8 | 143.8 | 143.8 | 177.8 | 143.8 | 143.8 | | 177.8 | |
| Length (mm) | 100 | 152.4 | 200 | 30 | 100 | 176 | 30 | 40 | | 254 | |
| Volume (L) | 1.62 | 2.48 | 3.25 | 0.49 | 1.62 | 4.37 | 0.49 | 0.65 | | 6.31 | |
| Initial pressure loss (kPa) | 0.72 | 1.87 | 1.36 | 0.18 | 0.72 | 2.5 | 0.18 | 0.3 | | 3.31 | |
| Pressure loss with soot (kPa) | 0.72 | 14.05 | 1.36 | 0.18 | 0.72 | 19.03 | 0.18 | 0.3 | | 13.03 | |
| Loaded amount of catalyst (g) | 325 | 37 | 568 | 15 | 325 | 568 | 15 | 130 | 389 | 284 | 105 |
| Length of exhaust gas purifying device (mm) | | 482.4 | | | | 306 | | | 294 | | |

TABLE 3-continued

|  | | | | | | | | |
|---|---|---|---|---|---|---|---|---|
| Device initial pressure loss (kPa) | | 4.13 | | | 3.4 | | | 3.61 |
| Device pressure loss with soot (kPa) | | 16.31 | | | 19.93 | | | 13.33 |
| DOC total amount (g) | | 340 | | | 340 | | | 340 |
| SCR total amount (g) | | 568 | | | 568 | | | 568 |
| Isostatic strength (MPa) | — | 8.7 | — | — | — | 2.9 | — | — | 10.9 |
| Collecting efficiency (%) | — | 99.9 | — | — | — | 98.7 | — | — | 99.9 |

| | Comp. Ex. 4 | | | | Comp. Ex. 5 | | | |
|---|---|---|---|---|---|---|---|---|
| | Hybrid DPF | | | | Hybrid DPF | | | |
| | DOC | Partition wall | SCR | DOC (ASC) | DOC | Partition wall | SCR | DOC (ASC) |
| Dia. (mm) | 143.8 | 177.8 | | | 143.8 | 177.8 | | |
| Length (mm) | 40 | 254 | | | 40 | 254 | | |
| Volume (L) | 0.65 | 6.31 | | | 0.65 | 6.31 | | |
| Initial pressure loss (kPa) | 0.3 | 3.79 | | | 0.3 | 1.72 | | |
| Pressure loss with soot (kPa) | 0.3 | 13.95 | | | 0.3 | 7.09 | | |
| Loaded amount of catalyst (g) | 130 | 38 | 540 | 200 | 130 | 38 | 540 | 200 |
| Length of exhaust gas purifying device (mm) | | 294 | | | | 294 | | |
| Device initial pressure loss (kPa) | | 4.09 | | | | 2.02 | | |
| Device pressure loss with soot (kPa) | | 14.25 | | | | 7.39 | | |
| DOC total amount (g) | | 340 | | | | 340 | | |
| SCR total amount (g) | | 568 | | | | 568 | | |
| Isostatic strength (MPa) | — | | 17.4 | | — | | 2.8 | |
| Collecting efficiency (%) | — | | 99.0 | | — | | 99.9 | |

TABLE 4

| | Comp. Ex. 6 | | | | Comp. Ex. 7 | | | |
|---|---|---|---|---|---|---|---|---|
| | Hybrid DPF | | | | Hybrid DPF | | | |
| | DOC | Partition wall | SCR | DOC (ASC) | DOC | Partition wall | SCR | DOC (ASC) |
| Dia. (mm) | 143.8 | 177.8 | | | 143.8 | 177.8 | | |
| Length (mm) | 40 | 254 | | | 40 | 254 | | |
| Volume (L) | 0.65 | 6.31 | | | 0.65 | 6.31 | | |
| Initial pressure loss (kPa) | 0.3 | 4.45 | | | 0.3 | 3.31 | | |
| Pressure loss with soot (kPa) | 0.3 | 11.62 | | | 0.3 | 6.3 | | |
| Loaded amount of catalyst (g) | 130 | 38 | 540 | 200 | 130 | 38 | 540 | 200 |
| Length of exhaust gas purifying device (mm) | | 294 | | | | 294 | | |
| Device initial pressure loss (kPa) | | 4.75 | | | | 3.61 | | |
| Device pressure loss with soot (kPa) | | 11.62 | | | | 6.6 | | |
| DOC total amount (g) | | 340 | | | | 340 | | |
| SCR total amount (g) | | 568 | | | | 568 | | |
| Isostatic strength (MPa) | — | | 12.1 | | — | | 0.5 | |
| Collecting efficiency (%) | — | | 99.9 | | — | | 98.8 | |

TABLE 5

| | Structure | Partition wall thickness (mm) | Partition wall porosity (%) | Partition wall ave. pore dia. (μm) | Cell density (cells/cm²) | Projecting portion thickness (mm) | Projecting portion porosity (%) |
|---|---|---|---|---|---|---|---|
| Comparative Example 1 | Usual | 0.305 | 48 | 12 | 46.5 | — | — |
| Comparative Example 2 | Usual | 0.305 | 65 | 23 | 46.5 | — | — |

TABLE 5-continued

| | | | | | | | |
|---|---|---|---|---|---|---|---|
| Comparative Example 3 | Hybrid wall | 0.305 | 48 | 12 | 46.5 | 0.305 | 48 |
| Comparative Example 4 | Hybrid wall | 0.305 | 35 | 12 | 46.5 | 0.305 | 35 |
| Comparative Example 5 | Hybrid wall | 0.305 | 48 | 12 | 46.5 | 0.075 | 48 |
| Comparative Example 6 | Hybrid wall | 0.305 | 48 | 12 | 46.5 | 0.445 | 48 |
| Comparative Example 7 | Hybrid wall | 0.305 | 75 | 12 | 46.5 | 0.305 | 75 |
| Example 1 | Hybrid wall | 0.305 | 48 | 12 | 46.5 | 0.305 | 48 |
| Example 2 | Hybrid wall | 0.305 | 48 | 12 | 46.5 | 0.305 | 48 |
| Example 3 | Hybrid wall | 0.305 | 40 | 12 | 46.5 | 0.305 | 40 |
| Example 4 | Hybrid wall | 0.305 | 48 | 12 | 46.5 | 0.105 | 48 |
| Example 5 | Hybrid wall | 0.305 | 48 | 12 | 46.5 | 0.410 | 48 |
| Example 6 | Hybrid wall | 0.305 | 48 | 26 | 46.5 | 0.305 | 48 |

| | Projecting portion ave. pore dia. (μm) | Partition wall coat ratio (%) | ISO strength | Initial pressure loss | Pressure loss with soot | Collecting efficiency |
|---|---|---|---|---|---|---|
| Comparative Example 1 | — | 100 | OK | NG | NG | OK |
| Comparative Example 2 | — | 100 | NG | OK | NG | OK |
| Comparative Example 3 | 12 | 50 | OK | OK | NG | OK |
| Comparative Example 4 | 12 | 5 | OK | NG | NG | OK |
| Comparative Example 5 | 12 | 5 | NG | OK | OK | OK |
| Comparative Example 6 | 12 | 5 | OK | NG | OK | OK |
| Comparative Example 7 | 12 | 5 | NG | OK | OK | OK |
| Example 1 | 12 | 5 | OK | OK | OK | OK |
| Example 2 | 12 | 40 | OK | OK | OK | OK |
| Example 3 | 12 | 5 | OK | OK | OK | OK |
| Example 4 | 12 | 5 | OK | OK | OK | OK |
| Example 5 | 12 | 5 | OK | OK | OK | OK |
| Example 6 | 26 | 5 | OK | OK | OK | NG |

[Porosity]:

Porosity of each of the partition walls and the projecting portions were calculated by a following method. Firstly, SEM photographs of three portions of the partition walls of the plugged honeycomb structure in the cross section perpendicular to the extending direction of the cell were arbitrarily photographed by a scanning type electron microscope (SEM). In one view field, a vertical size×a horizontal size was "p×p", when a size of one cell (a cell pitch) was "p". Next, each photographed image was binarized by image analysis, to divide into cavity portions (i.e., pore portions) and portions other than the cavity portions. Next, a ratio of an area corresponding to the cavity portions in each image was calculated, and an average value was obtained. In this way, the porosity of each of the partition walls and the projecting portions was calculated.

[Average Pore Diameter]:

An average pore diameter of the partition walls was a value measured by the image analysis in the same manner as in the porosity of each partition wall.

As to the prepared honeycomb catalyst body or exhaust gas purifying device, respective evaluations of [Initial Pressure Loss], [Pressure Loss with Soot], [Isostatic Strength] and [Collecting Efficiency] were carried out. An evaluating method of each evaluation is as follows.

[Initial Pressure Loss]:

As to the exhaust gas purifying device (including a can member in which honeycomb catalyst bodies were arranged in series and contained), gas at 400° C. was supplied at a flow rate of 200 kg/hour, to measure the initial pressure losses of the honeycomb catalyst body and the exhaust gas purifying device. The measured initial pressure loss of the exhaust gas purifying device was evaluated in accordance with the following basis for evaluation. In the exhaust gas purifying device, a case where the initial pressure loss is 4.0 kPa or more is "NG", and a case where the initial pressure loss is smaller than 4.0 kPa is "OK".

[Pressure Loss with Soot]:

As to the exhaust gas purifying device (including the can member in which honeycomb catalyst bodies were arranged in series and contained), 4 g/L of soot was deposited by an artificial soot generating device. Gas at 400° C. was supplied at a flow rate of 200 kg/hour in a state where the soot was deposited, to measure the pressure losses with the soot of the honeycomb catalyst body and the exhaust gas purifying device. The measured pressure loss with the soot of the exhaust gas purifying device was evaluated in accordance with the following basis for evaluation. In the exhaust gas purifying device, a case where the pressure loss with the soot is 13 kPa or more is "NG", and a case where the pressure loss with soot is smaller than 13 kPa is "OK".

[Isostatic Strength]:

The isostatic strength of the prepared honeycomb catalyst body (the hybrid DPF) was measured. The isostatic strength was measured on the basis of an isostatic breaking strength test stipulated in automobile standard (JASO standard) M505-87 issued by the Society of Automotive Engineers of Japan. The isostatic breaking strength test is a test in which a honeycomb catalyst body is disposed in a rubber tubular container, and the container is closed with a lid of a plate made of aluminum, to carry out isotropic pressurizing compression in water. The isostatic breaking strength is indicated by an applied pressure value (MPa) when the honeycomb catalyst body breaks. It is to be noted that the isostatic breaking strength test is a test to simulate a compressive load application of the honeycomb catalyst body contained in a can member in a state where a peripheral surface of the honeycomb catalyst body is held, when the honeycomb catalyst body is mounted in a car. Additionally, in Comparative Examples 1 and 2, isostatic strengths were measured, when catalysts were loaded onto usual (conventional) DPFs.

The measured isostatic strengths were evaluated in accordance with the following basis for evaluation. That is, a case where the isostatic strength of the honeycomb catalyst body (the hybrid DPF) is 3 MPa or less is "NG", and a case where the isostatic strength is in excess of 3 MPa is "OK".

[Collecting Efficiency]:

The collecting efficiency of the prepared honeycomb catalyst body was measured. Specifically, the honeycomb catalyst body (the hybrid DPF) was set to the artificial soot generating device, and supply conditions of the exhaust gas including the soot were set to a gas flow rate of 174 kg/hour and a gas temperature of 290° C. Next, a soot deposition speed was set to 2 g/hour, and concentrations of the soot in the gas on an inlet side (upstream) and an outlet side (downstream) of the honeycomb catalyst body were measured by a smoke meter. The collecting efficiency is a value at a deposited soot amount of 0.5 (g/honeycomb catalyst body). The collecting efficiency is calculated from the measured value of the smoke meter (the concentration of the soot) in terms of the following calculating equation. The calculated collecting efficiency was evaluated in accordance with the following basis for evaluation. A case where the collecting efficiency is 95% or more is "OK", and a case where the collecting efficiency is smaller than 95% is "NG".

$$\text{collecting efficiency (\%)} = 100 \times \{1 - (\text{the concentration of the soot in the downstream gas of the honeycomb catalyst body})/(\text{the concentration of the soot in the upstream gas of the honeycomb catalyst body})\} \quad \text{Equation}$$

Examples 2 to 6

The exhaust gas purifying devices were prepared in the same manner as Example 1 except that honeycomb catalyst bodies and the exhaust gas purifying devices satisfying conditions shown in Table 1 were prepared. Afterward, the respective prepared honeycomb catalyst bodies and exhaust gas purifying devices were evaluated in the same manner as in Example 1. The results are shown in Table 1, Table 2, and Table 5.

Comparative Examples 1 to 7

The exhaust gas purifying devices of Comparative Examples 1 to 7 were prepared in the same manner in Example 1 except that honeycomb catalyst bodies and exhaust gas purifying devices satisfying conditions shown in Table 3 and Table 4 were prepared. Afterward, the respective prepared honeycomb catalyst bodies and exhaust gas purifying devices were evaluated in the same manner as in Example 1. The results are shown in Table 3 to Table 5.

Additionally, in Comparative Example 1, the exhaust gas purifying device was used in which in order from an upstream side, a honeycomb catalyst body loaded with a DOC, a diesel particulate filter, a honeycomb catalyst body loaded with an SCR and a honeycomb catalyst body loaded with an ASC were arranged in series. In this exhaust gas purifying device, an urea supply nozzle was interposed between the diesel particulate filter and the honeycomb catalyst body loaded with the SCR. A catalyst density of the honeycomb catalyst body loaded with the DOC was 200 g/l. The catalyst loaded onto the diesel particulate filter was the DOC, and a density of the catalyst was 15 g/l. A catalyst density of the honeycomb catalyst body loaded with the SCR was 175 g/l. A catalyst density of the honeycomb catalyst body loaded with the ASC was 30 g/l. It is to be noted that in the tables, the honeycomb catalyst body loaded with the DOC is indicated by "DOC", the diesel particulate filter is indicated by "DPF", the honeycomb catalyst body loaded with the SCR is indicated by "SCR", and the honeycomb catalyst body loaded with the ASC is indicated as "ASC".

In Comparative Example 2, the exhaust gas purifying device was used in which in order from an upstream side, a honeycomb catalyst body loaded with a DOC, a diesel particulate filter loaded with an SCR and a honeycomb catalyst body loaded with an ASC were arranged in series. In this exhaust gas purifying device, an urea supply nozzle was interposed between the diesel particulate filter and the diesel particulate filter loaded with the SCR. A catalyst density of the honeycomb catalyst body loaded with the DOC was 200 g/l. A catalyst density of the diesel particulate filter loaded with the SCR was 130 g/l. A catalyst density of the honeycomb catalyst body loaded with the ASC was 30 g/l. It is to be noted that in Table 3, the diesel particulate filter loaded with the SCR is indicated by "the SCR loading DPF".

It was possible to confirm that each of the honeycomb catalyst bodies of Examples 1 to 6 was capable of shortening a length of the whole exhaust gas purifying device, and had high mechanical strength, less pressure loss, and suitable purification performance. Moreover, it was possible to confirm that each of the honeycomb catalyst bodies of Examples 1 to 5 had suitable collecting efficiency.

A honeycomb catalyst body of the present invention can suitably be used in purification of an exhaust gas.

DESCRIPTION OF REFERENCE SIGNS

2: inflow side end face, 3: outflow side end face, 4: cell, 4a: inflow cell, 4b: outflow cell, 5: partition wall, 6: small cell, 7: peripheral wall, 8: plugged portion, 8a: inflow side plugged portion, 8b: outflow side plugged portion, 9 and 19: projecting portion, 9a and 19a: inflow cell side projecting portion, 9b and 19b: outflow cell side projecting portion, 10: plugged honeycomb structure, and 100 and 101: honeycomb catalyst body.

What is claimed is:

1. A honeycomb catalyst body comprising:
   a plugged honeycomb structure having porous partition walls defining a plurality of cells extending from an inflow side end face to an outflow side end face to become through channels of a fluid, inflow side plugged portions provided at outflow side ends of the predetermined cells, outflow side plugged portions provided at inflow side ends of the remaining cells, and porous projecting portions projecting so as to extend from the partition walls into inflow cells being the cells provided with the outflow side plugged portions and into outflow cells being the cells provided with the inflow side plugged portions and being formed integrally with the partition walls; and catalysts loaded onto the projecting portions of the plugged honeycomb structure,
wherein a porosity of each of the partition walls of the plugged honeycomb structure is from 40% to 70%,
a thickness of each of the projecting portions is from 30 to 140% of a thickness of each of the partition walls,
an amount of the catalyst loaded onto the partition walls in a cross section perpendicular to an extending direction of the cells is 40% or less of a total amount of the catalysts loaded onto the plugged honeycomb structure, and an amount of the catalyst to be loaded onto the partition walls is smaller than an amount of the catalyst to be loaded onto the projecting portions,
the catalyst loaded onto the projecting portions extending into the inflow cells of the plugged honeycomb structure is a selective reduction catalyst, and
the catalyst loaded onto the projecting portions extending into the outflow cells of the plugged honeycomb structure is an ammonia slip preventing catalyst.

2. The honeycomb catalyst body according to claim 1, wherein the amount of the catalyst loaded onto the partition walls of the plugged honeycomb structure is 5% or less of the total amount of the catalysts loaded onto the plugged honeycomb structure.

3. The honeycomb catalyst body according to claim 2, wherein each of the projecting portions of the plugged honeycomb structure is in the form of a wall defining the cell to form a plurality of cells.

4. The honeycomb catalyst body according to claim 1, wherein an average pore diameter of the partition walls of the plugged honeycomb structure is 25 μm or less.

5. The honeycomb catalyst body according to claim 4, wherein each of the projecting portions of the plugged honeycomb structure is in the form of a wall defining the cell to form a plurality of cells.

6. The honeycomb catalyst body according to claim 1, wherein each of the projecting portions of the plugged honeycomb structure is in the form of a wall defining the cell to form a plurality of cells.

7. The honeycomb catalyst body according to claim 1, wherein each of the projecting portions of the plugged honeycomb structure is in the form of a protrusion projecting from the partition wall.

8. The honeycomb catalyst body according to claim 1, wherein the thickness of each of the partition walls of the plugged honeycomb structure is from 64 to 508 μm.

* * * * *